F. HENNEBÖHLE.
PACKING.
APPLICATION FILED MAR. 30, 1908.

907,597.

Patented Dec. 22, 1908.

2 SHEETS—SHEET 1.

Witnesses:

Inventor
Frank Henneböhle
By Luther L. Miller
Atty

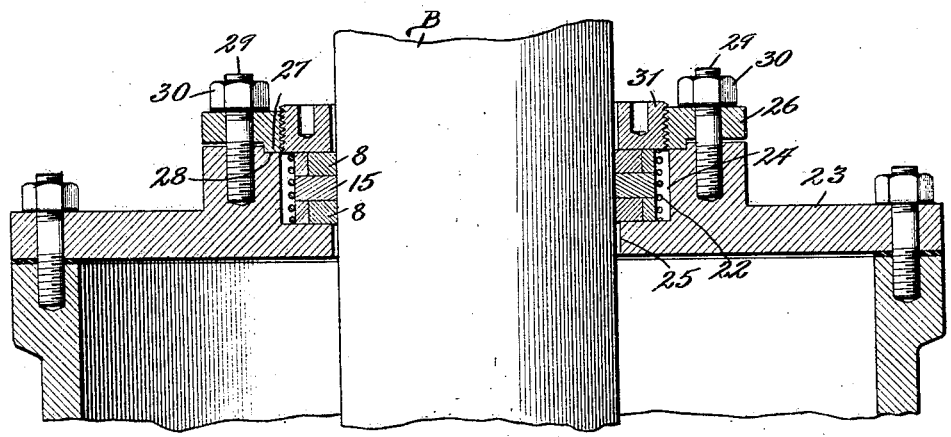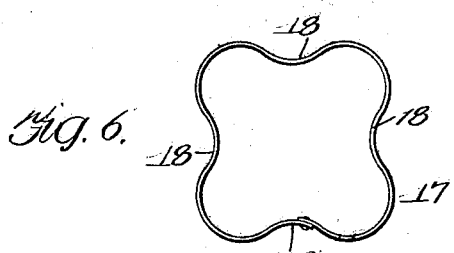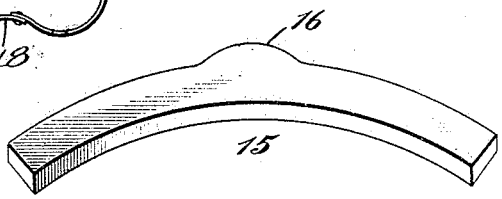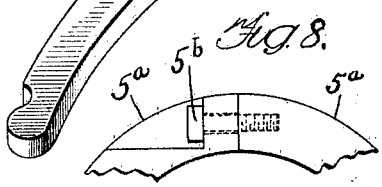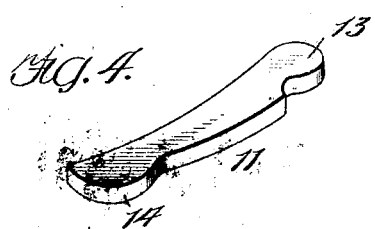

UNITED STATES PATENT OFFICE.

FRANK HENNEBÖHLE, OF CHICAGO, ILLINOIS.

PACKING.

No. 907,597.

Specification of Letters Patent.

Patented Dec. 22, 1908.

Application filed March 30, 1908. Serial No. 424,205.

*To all whom it may concern:*

Be it known that I, FRANK HENNEBÖHLE, a citizen of the United States, residing at Chicago, in the county of Cook and State of Illinois, have invented certain new and useful Improvements in Packing, of which the following is a specification.

One of the objects of this invention is to provide an improved metallic packing for packing piston rods and other moving machine elements.

Another object of the invention is to provide means for securing the packing in operative relation to the part to be packed.

A further object of the invention is to provide means for applying metallic packing to machines not originally intended to receive such packing.

Figure 1:
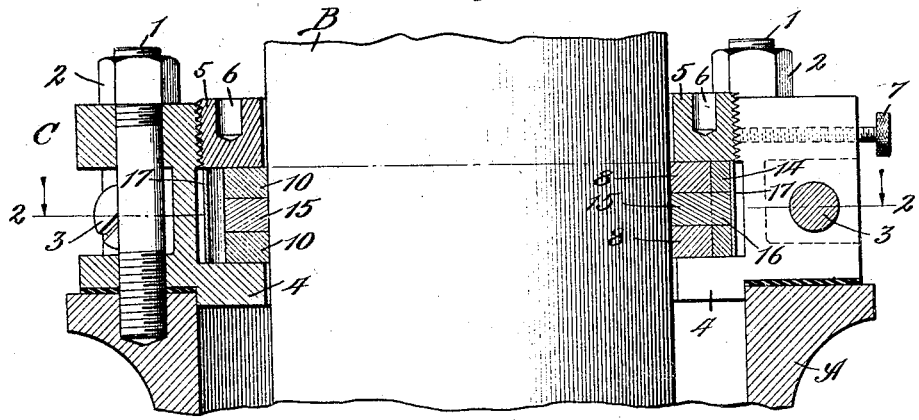
Figure 2:
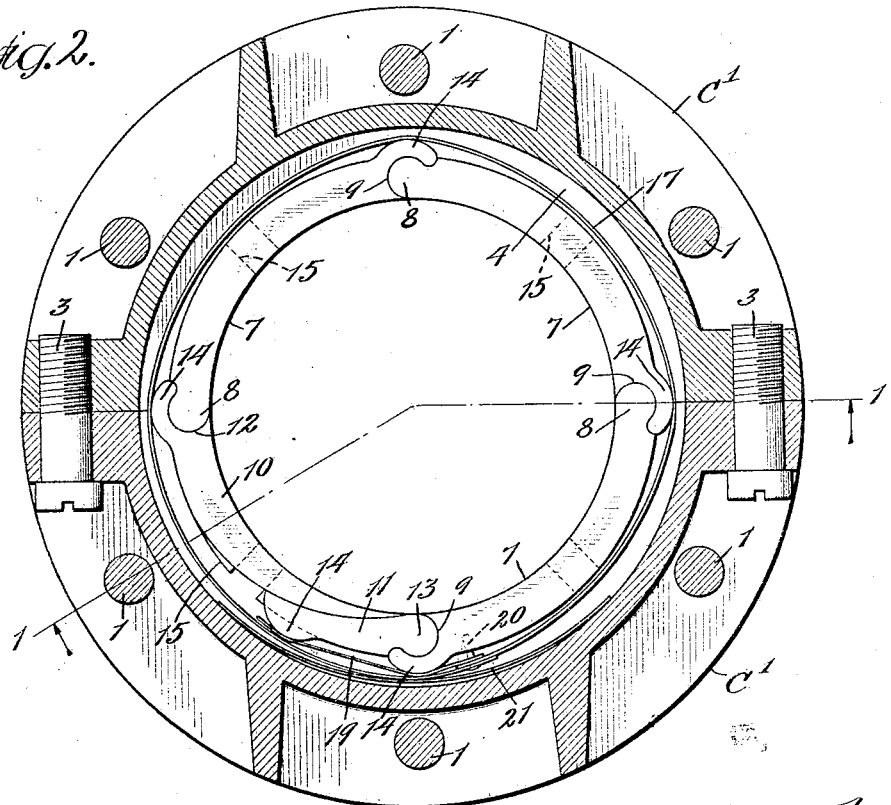

In the accompanying drawings, Figure 1 is a sectional view illustrating an embodiment of my invention, the view being taken on the plane of dotted line 1 1 of Fig. 2. Fig. 2 is a section on dotted line 2 2 of Fig. 1. Figs. 3, 4 and 5 are perspective detail views of individual packing sections. Fig. 6 is a detail view of a spring for holding the packing in contact with the moving element. Fig. 7 is a sectional view showing another means of applying the packing, and an alternative means for holding the packing in contact with the moving part. Fig. 8 is a fragmental view of an adjusting ring.

Referring to Fig. 1, A indicates the fixed portion of a stuffing box and B a piston rod or other moving part extending through said stuffing box. The embodiment shown in Fig. 1 comprises means for attaching my improved packing to an engine or other machine not originally intended for such packing, said means comprising a member C which may replace the gland of an ordinary stuffing box. The member C is herein illustrated as secured in place by means of stud bolts 1 and nuts 2. Said member is in annular form and surrounds the piston rod or other moving part. In order to permit of readily applying the packing to an engine the crosshead of which cannot conveniently be removed, I form the member C in two similar sections C' as illustrated in Fig. 2, said sections being connected together by means of the cap screws 3. The member C comprises an inwardly extending flange 4 against which the packing material is held by an adjusting ring 5 having a screw-thread connection with the member C. The ring 5 may be made in one piece, or it may be made in two semicircular sections 5ª secured together in a suitable way, as by means of screws 5ᵇ (Fig. 8). Any suitable means may be provided for turning the adjusting ring 5. I have herein shown recesses 6 to receive a spanner wrench or other similar tool. The ring 5 may be locked against accidental rotation by means of a set screw 7.

The packing material comprises a plurality of contractible rings of suitable packing metal. In the present instance I have shown three such rings, the two end rings being similar and the intermediate or filler ring assuming a special form.

Referring to Fig. 2 it will be seen that the end rings comprise a number of curved segments or links 7 flexibly connected together, as, for example, by means of a knuckle 8 upon one end of each link, said knuckle being adapted to lie within a socket 9 formed on the opposite end of each link. I have herein shown three such links flexibly connected together, the spaces between the adjacent ends of said series being filled by two overlapping members 10 and 11 adapted to permit the ring formed by the members 7 and said overlapping members to contract as said members wear away. The member 10 is provided in one end with a socket 12 to receive the knuckle 8 upon the adjacent link 7. Upon one end of the member 11 is a knuckle 13 fitting within the socket 9 of the adjacent link 7. The member 10 is made tapering and is curved upon its outer side to contact the similarly curved inner surface of the member 11. On the free end of the member 11 and at the points of connection between the members 7, 10 and 11, projections 14 are formed against which bears a spring to be hereinafter described.

The intermediate or filler ring constituted by the segments 15 (Fig. 5) has open spaces therein between the adjacent ends of said segments to permit said filler ring to contract as its inner surface is worn away. Each of the segments 15 is provided on its outer side with a projection 16 upon which bears the spring hereinbefore alluded to.

The means shown in Figs. 1 and 2 for holding the packing rings in fluid-tight contact with the moving part B consists of a spring 17 in the form of a closed loop or circle. When in its unflexed position, the spring 17 assumes the shape shown in Fig. 6, the reentrant bends 18 being arranged in use to bear upon the projections 14 and 16. For holding the overlapping tongues or sections 10 and 11 in contact with the moving part B I may provide a special leaf spring 19, the springs 17 and 19 being secured together and to the packing by means of a pin 20. As a further means for contracting the packing rings into fluid-tight contact with the moving part B a leaf spring 21 may be interposed between the inner annular wall of the member C and said packing rings.

In lieu of the springs shown in Figs. 1, 2 and 6, I may use a coiled spring 22 wound about the packing material, as shown in Fig. 7, the ends of said spring being secured in place in any suitable way.

In an engine especially designed to receive metallic packing the stuffing box may take the form shown in Fig. 7. The cylinder head 23 is provided with an annular recess 24 surrounding the opening 25 through which the piston rod B passes. The packing is confined in said recess by means comprising a collar 26 having an annular flange 27 fitting within and forming a ground joint with a counter-bore 28 in the cylinder head. The collar 26 is secured to the cylinder head by means of the stud bolts 29 and nuts 30. An adjusting ring 31 has a screw-thread connection with the collar 26.

In use, as the inner sides of the packing-sections 7, 10 and 11 wear away the springs 17, 19 and 21 keep said sections in fluid-tight contact with the moving part. The sections 10 and 11 slide over one another as the end rings contract.

I claim as my invention:

1. Metallic packing comprising a series of segments flexibly connected together, and two overlapping sections connected to the opposite ends of said series.

2. Metallic packing comprising a series of segments arranged end to end, and two overlapping sections interposed between the ends of said series.

3. A metallic packing segment having a pivot knuckle at one end and a socket at the other adapted to receive a similar knuckle.

4. A metallic packing segment having a knuckle at one end, a socket at the other end, and a projection at the last mentioned end on the outer side of the segment.

5. A metallic packing segment having a central bearing projection on its outer side.

6. A metallic packing section having a knuckle at one end and a bearing projection at its other end on its outer side.

7. A metallic packing segment having a socket at one end, the other end of said segment tapering to a point, the inner and outer sides of said segment being curved on the arcs of circles, said curves extending to said point.

8. Packing comprising a jointed split ring, the ends of said ring overlapping, an annular spring bearing upon the joints of said ring, and a spring connected at one end to said annular spring and bearing at its other end upon said overlapping ends.

9. Metallic packing comprising three similar segments, each having a knuckle at one end and a socket at the other end, the knuckles of two of said segments lying in the sockets of adjacent segments; a segment having a socket at one end adapted to receive the knuckle of one of the first mentioned segments; a segment having a knuckle adapted to lie in the socket of one of the first mentioned segments, the two last mentioned segments being adapted to overlap; and means for holding all of said segments in contact with the part to be packed.

10. Packing comprising a jointed split ring, the ends of said ring overlapping, an annular spring bearing upon the joints in said ring, and a spring bearing upon said overlapping ends.

11. Packing comprising a split ring, the ends of said ring overlapping, an annular spring tending to contract said ring, and a spring bearing upon the split side or portion of said ring.

12. A packing-containing structure comprising an annular member having an inwardly-extending packing-supporting flange, a ring having a screw-thread connection with said annular member, and means for preventing rotation of said ring.

FRANK HENNEBÖHLE.

Witnesses:
L. L. MILLER,
GEORGE L. CHINDAHL.